UNITED STATES PATENT OFFICE.

FRANZ G. GRAUPNER, OF EVANSVILLE, INDIANA.

IMPROVEMENT IN DYEING FABRICS.

Specification forming part of Letters Patent No. 139,573, dated June 3, 1873; application filed May 3, 1873.

*To all whom it may concern:*

Be it known that I, FRANZ G. GRAUPNER, of Evansville, in the county of Vanderburg and State of Indiana, have invented a new and valuable Improvement in Dyes; and I do hereby declare that the following is a full, clear, and exact description of the construction of the same.

My invention relates to compounds for dyeing purposes; and consists in the novel combination of the ingredients, hereinafter mentioned in the manner substantially as described.

To enable others skilled in the art to make and use my dye, I will proceed to give a description thereof.

In a stone jar of proper size I place twenty-four pounds of muriatic acid, and add to it thirteen pounds of anvil-dust. This anvil-dust is sometives called oxyduloxyd of iron; and it consists of the dust, sparks, or cinders which fall from heated iron while being manipulated upon a blacksmith's anvil, or other analogous place. I permit these ingredients to dissolve and combine for a period of about twenty-four hours. I next place the stone jar with its contents in a sand-bath and evaporate the liquid to one-half its original bulk, care should be taken in commencing the boiling-process. The fire should be slow at first, but may subsequently be increased. After the mixture is evaporated to the proper quantity, I add thirteen pounds of water, I then let it cool and settle, and place the clear liquor in air-tight glass bottles for use.

The proportions herein given, together with the time and peculiar method of compounding the ingredients, I have found well adapted to the purpose required; but I do not limit myself to said proportions, time, or method.

The mixture above described is intended as a base for my dye, and it is used in the manner following: To form a dye of black, slate, drab, or other analogous color, I take, say, six hundred pounds of water and twenty-five pounds of quercitron, and boil them together for one hour, the quercitron being enveloped in a suitable bag. I then remove the bag and place thirty-five pounds extract of logwood in the liquor, and boil it until dissolved. I then add to it sixteen pounds of the compound of anvil-dust and muriatic acid, above described, and boil the mixture for fifteen minutes, or thereabouts. The dye is then ready to receive raw cotton warp, or other analogous material, which should only be allowed to remain about twenty seconds, and boiled. The warp or fabric is then wrung out and placed in another tub or vat with five hundred pounds of warm water. In this water I dissolve one pound of bichromate of potash. The warp or fabric is allowed to remain in the mixture about twenty seconds, after which it is ready for starching and finishing for use. The liquors should be preserved for future use.

What I claim as new, and desire to secure by Letters Patent, is—

1. The combination of oxyduloxyd of iron or anvil-dust with muriatic acid, as a base for dye, substantially as specified.

2. The dye, herein described, compounded of the materials and substantially in the manner set forth.

In testimony that I claim the above I have hereunto subscribed my name in the presence of two witnesses.

FRANZ GOTTHILF GRAUPNER.

Witnesses:
JACOB HERR,
JOHN W. GORSE.